United States Patent [19]

Hasegawa et al.

[11] Patent Number: 4,522,027
[45] Date of Patent: Jun. 11, 1985

[54] EXHAUST PARTICLE REMOVAL SYSTEM FOR AN INTERNAL COMBUSTION ENGINE

[75] Inventors: Yoji Hasegawa, Yokohama; Motohiro Shinzawa, Yokosuka, both of Japan

[73] Assignee: Nissan Motor Company, Ltd., Japan

[21] Appl. No.: 581,071

[22] Filed: Feb. 17, 1984

[30] Foreign Application Priority Data

Feb. 21, 1983 [JP] Japan ................................. 58-26307

[51] Int. Cl.³ ............................................. F01N 3/02
[52] U.S. Cl. ......................................... 60/274; 55/283; 55/466; 55/DIG. 10; 55/DIG. 30
[58] Field of Search .......................... 60/274, 277, 286; 55/283, DIG. 30, 466, DIG. 10

[56] References Cited

U.S. PATENT DOCUMENTS 4,450,682  5/1984  Sato ....................................... 60/303

FOREIGN PATENT DOCUMENTS

13114  1/1983  Japan ..................................... 60/277

Primary Examiner—Douglas Hart
Attorney, Agent, or Firm—Lowe, King, Price & Becker

[57] ABSTRACT

An exhaust passage extends from an internal combustion engine to conduct exhaust from the engine. A filter is disposed in the exhaust passage to filter particles out of the exhaust. A burner is disposed in the exhaust passage upstream of the filter to burn off the particles deposited on the filter. Fuel is supplied to the burner for a preset time when the filter clogs. The supplied fuel is ignited in the burner. In the case where the fuel supplied to the burner ceases to burn prior to the end of the preset time, the fuel supply to the burner is interrupted.

4 Claims, 5 Drawing Figures

EXHAUST PARTICLE REMOVAL SYSTEM FOR AN INTERNAL COMBUSTION ENGINE

BACKGROUND OF THE INVENTION

This invention relates to a system for removing particles from exhaust produced by internal combustion engines, such as diesel engines.

Exhaust produced by diesel engines has a relatively high content of polluting particles composed of carbon, unburned fuel, and partially burned fuel. Filters are conventionally disposed in engine exhaust systems to remove the particles from the exhaust. In this case, burners positioned in the exhaust systems upstream of the filters are often employed to burn off the particles deposited on the filters in order to unclog and rejuvenate the filters.

A previously proposed particle-removing system further includes a device which determines whether the fuel in the burner has been successfully ignited. When the ignition has failed, the actions necessary to ignite the fuel are repeated.

There is a chance that the fuel will undesirably go out or be extinguished after having been successfully ignited. The previous system can not appropriately deal with such a troublesome problem.

SUMMARY OF THE INVENTION

It is an object of this invention to provide an exhaust particle removal system for an internal combustion engine which acceptably deals with undesirable extinguishment of fuel in a burner.

In accordance with this invention, an exhaust particle removal system is applied to an internal combustion engine from which an exhaust passage extends to conduct exhaust from the engine. The system includes a filter and a burner. The filter is disposed in the exhaust passage to filter particles out of the exhaust. The burner is disposed in the exhaust passage upstream of the filter to burn off the particles deposited on the filter. Fuel is supplied to the burner for a preset time whenever the filter becomes clogged. The supplied fuel is ignited in the burner. In the case where the fuel supplied to the burner ceases to burn prior to the end of the preset time, the fuel supply to the burner is interrupted.

The above and other objects, features and advantages of this invention will be apparent from the following description of a preferred embodiment thereof, taken in conjunction with the drawings.

DESCRIPTION OF THE PREFERRED EMBODIMENT

Figure 1:
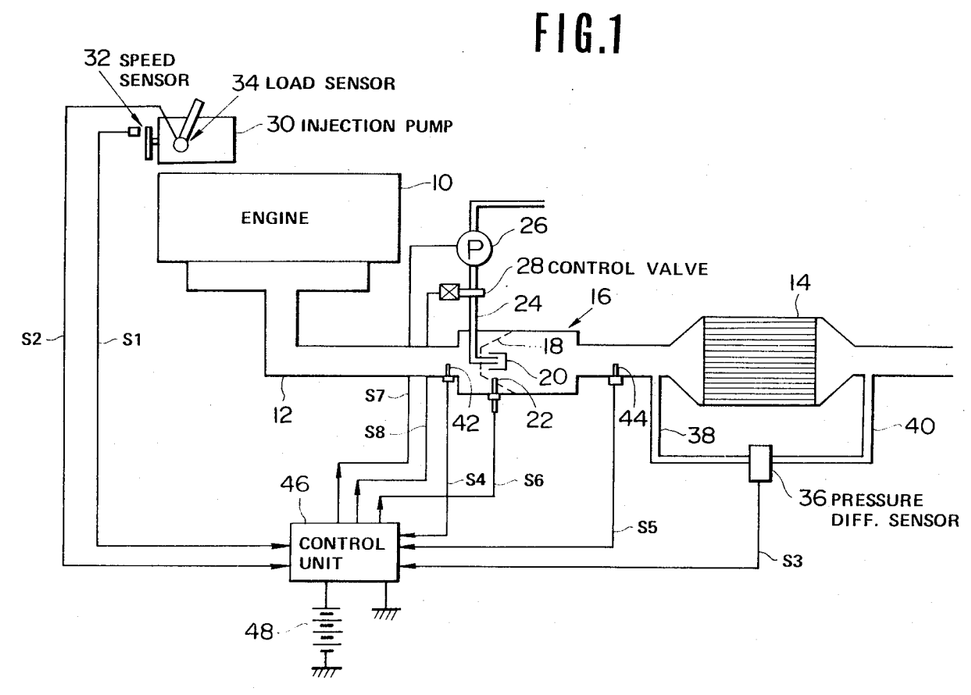
FIG. 1 is a diagram of an exhaust particle removal system according to an embodiment of this invention.

With reference to FIG. 1, a diesel engine 10 is equipped with a fuel injection pump 30 which serves to inject fuel into the combustion chambers of the engine 10. The fuel injection pump 30 has a drive shaft which is coupled to the crankshaft of the engine 10 so that the fuel injection pump 30 will be driven by the engine 10. The drive shaft of the fuel injection pump 30 rotates in accordance with rotation of the crankshaft of the engine 10. The fuel injection pump 30 has a control lever, the position of which determines the rate of fuel supply to the combustion chambers of the engine 10.

The engine 10 is provided with an exhaust passage 12 extending from combustion chambers of the engine 10 to conduct exhaust from the combustion chambers to the atmosphere. A filter 14 of a honeycomb structure is disposed within the exhaust passage 12 to remove polluting particles from the exhaust. These particles are composed of carbon, unburned fuel, and partially burned fuel, and are suspended in the exhaust gas. Specifically, the filter 14 serves to catch these particles and thereby separate them from the exhaust gas.

A burner 16 is disposed in the exhaust passage 12 at a point upstream of the filter 14 to burn off the particles retained and collected by the filter 14 in order to unclog and rejuvenate the filter 14. The burner 16 includes a combustion liner 18, a vaporizing cylindrical cup 20, and a glow plug 22. The combustion liner 18 has walls extending across the exhaust passage 12. These walls are formed with a plurality of apertures through which the exhaust enters a combustion chamber defined downstream of the combustion liner 18. A fuel supply pipe 24 extends through the combustion liner 18 to conduct fuel to the combustion chamber. Specifically, the outlet of the fuel supply pipe 24 opens into the open end of the vaporizing cup 20 disposed within the combustion chamber. The flow of fuel discharged into the vaporizing cup 20 via the outlet of the fuel supply pipe 24 is reversed by the closed end of the vaporizing cup 20 before the fuel exits from the vaporizing cup 20 via the open end thereof. The glow plug 22 projects into the combustion chamber to ignite the fuel flowing into the combustion chamber from the open end of the cylindrical cup 20. The resulting burning of the fuel heats the exhaust flowing through the burner 16. The heated exhaust enters the filter 14 and burns off the particles deposited on the filter 14. It should be noted that the exhaust includes adequate oxygen to burn the fuel and the particles in the case of a diesel engine. Also, the resulting burning of the fuel heats the cylindrical cup 20. When hot, the cylindrical cup 20 promotes the vaporization of the fuel flowing therein.

An electrically-powered fuel pump 26 has an inlet connected to a fuel tank (not shown) and an outlet connected to the inlet of the fuel supply pipe 24. The fuel pump 26 serves to draw fuel from the fuel tank and then drive it toward the burner 16 via the fuel supply pipe 24. An electrically-powered fuel control valve 28 is disposed along the fuel supply pipe 24 to selectively block and open the fuel supply pipe 24 to selectively disable and enable the supply of fuel to the burner 16.

A mixture of air and fuel may be supplied to the burner 16 in place of the pure fuel. In this case, an air pump supplies air to a mixer interposed in the fuel supply pipe 24. This mixer serves to atomize the fuel and form a mixture of air and fuel, which is then supplied to the burner 16.

An engine speed sensor 32 is associated with the drive shaft of the fuel injection pump 30 to sense the rotational speed of the engine 10. Specifically, the speed sensor 32 includes a combination of a magnetic pickup and a gear or toothed disc. The toothed disc is mounted on the drive shaft of the fuel injection pump 30. The magnetic pickup is fixedly located near the toothed disc. An electrical signal S1 induced across the magnetic pickup has a frequency proportional to the rotational speed of the engine 10.

An engine load sensor 34 is associated with the control lever of the fuel injection pump 30 to sense the rate of fuel supply to the engine 10 and in turn the load on the engine 10. Specifically, the load sensor 34 includes a potentiometer mechanically connected to the control lever of the fuel injection pump 30. The potentiometer generates an electrical signal S2, the voltage of which varies as a function of the angular position of the control lever of the fuel injection pump 30. In this way, the signal S2 represents the rate of fuel supply to the engine 10.

A pressure difference sensor 36 has first and second inlets, which are connected to the exhaust passage 12 at points upstream and downstream of the filter 14 via passages 38 and 40, respectively. The pressure difference sensor 36 senses the difference in pressure between these two points, that is, the pressure across the filter 14. The pressure difference sensor 36 generates an electrical signal S3, the voltage of which varies as a function of the pressure across the filter 14. Since the pressure across the filter 14 increases with increases in the degree of clogging of the filter 14, the signal S3 indicates the degree of clogging of the filter 14.

A first temperature sensor 42 is disposed in the exhaust passage 12 at a point upstream of the burner 16 to sense the temperature at this point. The first temperature sensor 42 generates an electrical signal S4, the voltage of which varies as a function of the temperature in the exhaust passage 12 upstream of the burner 16. A second temperature sensor 44 is disposed in the exhaust passage 12 at a point downstream of the burner 16 but upstream of the filter 14 to sense the temperature at this point. The second temperature sensor 44 generates an electrical signal S5, the voltage of which varies as a function of the temperature in the exhaust passage 12 downstream of the burner 16 but upstream of the filter 14. As described later, the signals S4 and S5 are used in determining whether the fuel in the burner 16 has or has not been successfully ignited. Furthermore, the signal S5 is used in recognizing undesirable extinguishment of fuel in the burner 16 after successful ignition of the fuel.

A control unit 46 includes an electrical circuit, which is connected across a DC power source 48 in order to be electrically powered by the source 48. Furthermore, the control unit 46 is electrically connected to the sensors 32, 34, 36, 42, and 44 to receive the engine speed signal S1, the engine load signal S2, the pressure difference signal S3, the upstream temperature signal S4, and the downstream temperature signal S5. The control unit 46 generates control signals S6, S7, and S8 on the basis of the signals S1, S2, S3, S4, and S5. The control unit 46 is electrically connected to the glow plug 22, the fuel pump 26, and the fuel control valve 28 to output the control signals S6, S7, and S8 to the glow plug 22, the fuel pump 26, and the fuel control valve 28, respectively. On the basis of the engine speed signal S1, the engine load signal S2, and the pressure difference signal S3, the control unit 46 determines whether or not the degree of clogging of the filter 14 exceeds a predetermined level. While the degree of clogging of the filter 14 remains lower than the predetermined level, the control unit 46 keeps the burner 16 inactive. When the degree of clogging of the filter 14 exceeds the predetermined level, the control unit 46 activates the burner 16 to burn off the particles deposited on the filter 14 and thereby unclog the filter 14. Activation of the burner 16 is performed by energizing the fuel pump 26 via the control signal S7, allowing the fuel control valve 28 to pass the fuel to the burner 16 via the control signal S8, and energizing the glow plug 22 via the control signal S6.

After the initiation of activation of the burner 16, the control unit 46 determines whether or not the fuel in the burner 16 has been successfully ignited on the basis of the temperature signals S4 and S5. When the fuel has not ignited, the control unit 46 repeates the actions necessary to activate the burner 16. These actions are repeated until the fuel has been successfully ignited. After the fuel has ignited, the control unit 46 de-energizes the glow plug 22 via the control signal S6.

After ignition of the fuel, the control unit 46 determines whether or not the fuel in the burner 16 has undesirably gone out on the basis of the downstream temperature signal S5. When the burning of fuel has spontaneously gone out, the control unit 46 de-energizes the fuel pump 26 via the control signal S7 and closes the fuel control valve 28 via the control signal S8 to interrupt the fuel supply to the burner 16, and then repeats the actions necessary to activate the burner 16. This interruption of fuel supply to the burner 16 prevents waste of fuel and thus prevents a great amount of unburned fuel from entering and then burning in the filter 14, thereby generating excessive heat and damaging the filter 14. The actions necessary to activate the burner 16 are repeated until fuel combustion has continued for an adequately long time. After an adequate period of fuel combustion, the control unit 46 deactivates the burner 16. Deactivation of the burner 16 is performed by de-energizing the fuel pump 26 via the control signal S7 and forcing the fuel control valve 28 to block the fuel supply pipe 24 via the control signal S8.

Figure 2:
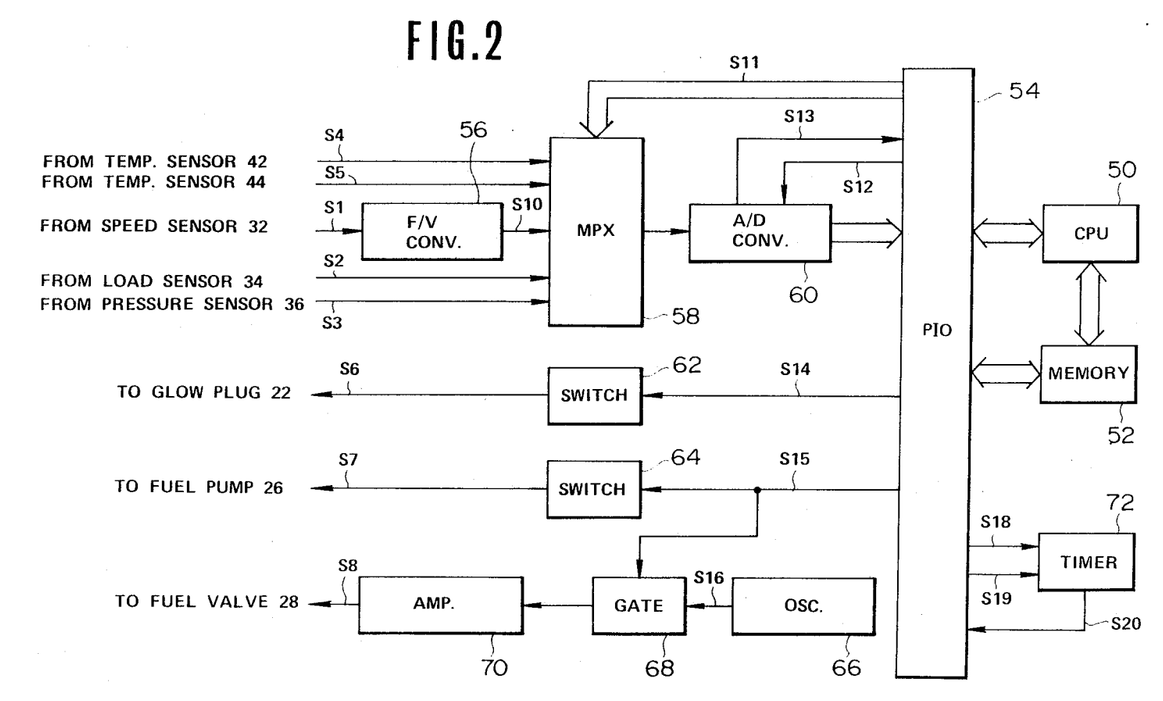
FIG. 2 is a detailed block diagram of the control unit of FIG. 1.

FIG. 2 shows the details of the control unit 46. The control unit 46 includes a digital microcomputer arrangement having a central processing unit (CPU) 50, a memory unit 52, and a peripheral input/output circuit (PIO) 54. The processing unit 50 is connected to the memory unit 52 and the input/output circuit 54. The memory unit 52 includes a read-only memory and a random-access memory.

The input terminal of a frequency-to-voltage (F/V) converter 56 is connected to the output terminal of the engine speed sensor 32 to receive the engine speed signal S1. The F/V converter 56 changes the engine speed signal S1 into a corresponding signal S10, the voltage of which varies as a function of the frequency of the signal S1, that is, the engine speed.

A first input terminal of a multiplexer (MPX) 58 is connected to the output terminal of the F/V converter 56 to receive the engine speed voltage signal S10. Second, third, fourth, and fifth input terminals of the multiplexer 58 are connected to the output terminals of the sensors 34, 36, 42, and 44 to receive the engine load signal S2, the pressure difference signal S3, the upstream temperature signal S4, and the downstream temperature signal S5, respectively. The output terminal of the multiplexer 58 is connected to the input terminal of an analog-to-digital (A/D) converter 60. The control terminal of the multiplexer 58 is connected to the input/output circuit 54 to receive a channel selection control signal S11. In compliance with the selection signal S11, the multiplexer 58 selects one of the signals S2, S3, S4, S5, and S10 and passes the selected signal to the A/D converter 60.

The output terminal of the A/D converter 60 is connected to the input/output circuit 54. The A/D converter 60 changes the analog input signal into a corresponding digital signal, which is outputted to the input/output circuit 54. In this way, the analog signal selected by the multiplexer 58 is converted into a corresponding digital signal, which is supplied to the input/output circuit 54. The control terminal of the A/D converter 60 is connected to the input/output circuit 54 to receive a start control signal S12. Upon the receipt of the start signal S12, the A/D converter 60 commences the conversion of the input signal. The end-of-conversion (EOC) terminal of the A/D converter 60 is connected to the input/output circuit 54 to supply the circuit 54 with an EOC signal S13 indicating that the conversion of the input signal has been completed.

A first switch circuit 62 has a control terminal, which is connected to the input/output circuit 54 to receive a primary glow plug control signal S14. The first switch circuit 62 generates the final glow plug control signal S6 in response to the primary signal S14. The output terminal of the first switch circuit 62 is connected to the glow plug 22 to supply the final signal S6 to the glow plug 22. Specifically, the final signal S6 assumes either a high level or a low level. When the final signal S6 is at the high level, the glow plug 22 is energized.

When the final signal S6 is at the low level, the glow plug 22 is de-energized. The first switch circuit 62 can be a bistable multivibrator or a flip-flop circuit.

A second switch circuit 64 has a control terminal, which is connected to the input/output circuit 54 to receive a primary fuel control signal S15. The second switch circuit 64 generates the final fuel pump control signal S7 in response to the primary signal S15. The output terminal of the second switch circuit 64 is connected to the fuel pump 26 to supply the final signal S7 to the fuel pump 26. Specifically, the final signal S7 assumes either a high level or a low level. When the final signal S7 is at the high level, the fuel pump 26 is energized. When the final signal S7 is at the low level, the fuel pump 26 is deenergized. The second switch circuit 64 can be a bistable multivibrator or a flip-flop circuit.

A rectangular wave oscillator 66 produces rectangular pulses S16 at a predetermined constant frequency. The input terminal of a gate 68 is connected to the output terminal of the oscillator 66 to receive the rectangular pulse signal S16. The output terminal of the gate 68 is connected to the input terminal of an amplifier 70. The gate 68 has a control terminal, which is connected to the input/output circuit 54 to receive the primary fuel control signal S15. While the fuel pump 26 remains energized by the control signal S7, the gate 68 passes the rectangular pulse signal S16 to the amplifier 70 in compliance with the primary control signal S15. While the fuel pump 26 remains de-energized by the control signal S7, the gate 68 interrupts the transmission of the rectangular pulse signal S16 to the amplifier 70 in compliance with the primary control signal S15. In the case where the primary control signal S15 is in a digital form which assumes a high level only while the fuel pump 26 is to be energized, the gate 68 can be an AND circuit, one input terminal of which is connected to the oscillator 66 to receive the rectangular pulse signal S16 and another input terminal of which is connected to the input/output circuit 54 to receive the primary control signal S15. The amplifier 70 serves to magnify the rectangular pulse signal S16 and thereby produce the fuel valve control signal S8. The output terminal of the amplifier 70 is connected to the fuel control valve 28 to supply the control signal S8 to the fuel control valve 28. When the control signal S8 assumes a high level, the fuel control valve 28 is opened. When the control signal S8 assumes a low level, the fuel control valve 28 is closed. Therefore, while the fuel pump 26 remains energized, the fuel control valve 28 is intermittently open and hence allows the supply of fuel to the burner 16. While the fuel pump 26 remains de-energized, the fuel control valve 28 remains closed and hence continues to interrupt the supply of fuel to the burner 16.

A timer 72 has a set terminal and a reset terminal, which are connected to the input/output circuit 54 to receive a set signal S18 and a reset signal S19 respectively. Triggered by the set signal S18, the timer 72 is set or activated to an ON state. In other words, when the timer 72 is triggered by the set signal S18, an output signal S20 from the timer 72 goes high. The timer 72 maintains this high level output S20 for a preset interval, provided that the timer 72 does not receive the reset signal S19 during this interval. After this interval, the timer 72 returns to an OFF state, that is, the output signal S20 from the timer 72 goes low. When the timer 72 receives the reset signal S19, the timer 72 is forcedly returned or reset to the OFF state. The output terminal of the timer 72 is connected to the input/output circuit 54 to supply the output signal S20 to the input/output circuit 54. The preset interval defined by the timer 72 is chosen to equal the length of time during which the burner 16 should remain activated to adequately clear the filter 14 of particulates. At the initiation of activation of the burner 16, the set signal S18 is outputted to the timer 72 to set the timer 72. When the output signal S20 from the timer 72 goes low, the control unit 46 deactivates the burner 16.

The above-mentioned components of the control unit 46 are connected to the DC power source 48 to be powered by the source 48. The connections of these components to the power source 48 are omitted from FIG. 2 for the sake of clarity.

The combination of the central processing unit 50, the memory unit 52, and the input/output circuit 54 serves to generate the primary control signals S14 and S15 on the basis of the signals S2, S3, S4, S5, and S10 outputted to the input/output circuit 54 via the multiplexer 58 and the A/D converter 60.

Figure 3A:
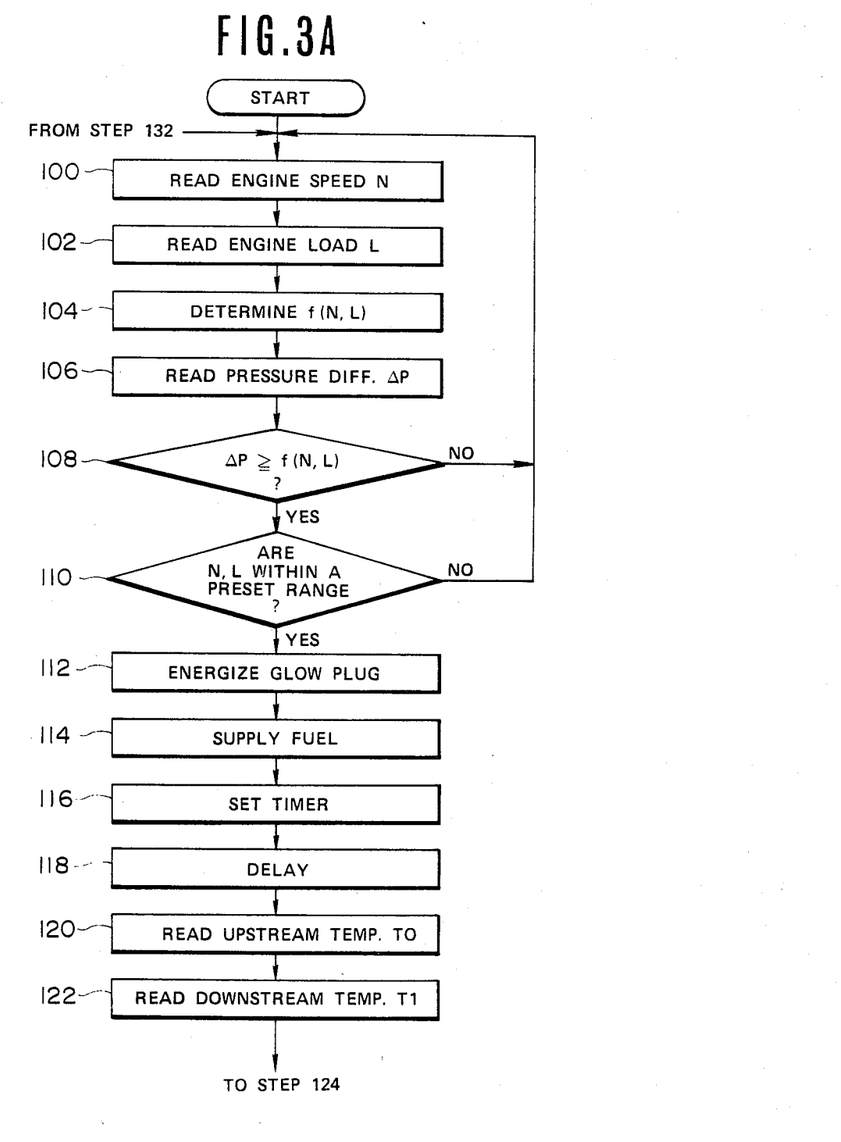
FIGS. 3A and 3B form a flowchart of a program determining the operation of the control unit in FIGS. 1 and 2.
Figures 3B, 4:
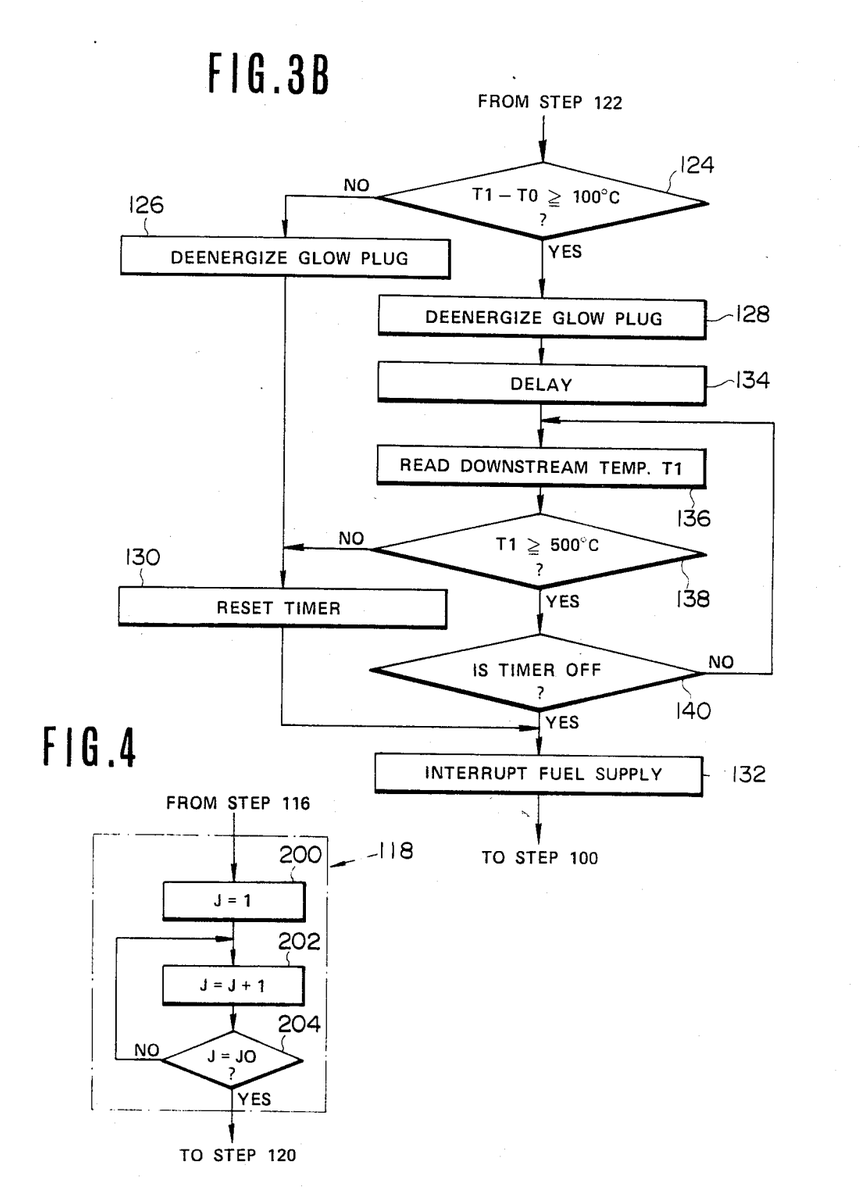
FIG. 4 is a detailed flowchart of the delay steps of FIGS. 3A and 3B.

The control unit 46 operates in accordance with a program stored in the read-only memory of the memory unit 52. FIGS. 3A and 3B together form a flowchart of this program. In a first step 100, the control unit 46 derives the current value N of engine speed from the engine speed signal S10. Specifically, the control unit 46 supplies the multiplexer 58 with a selection signal S11 designed to select the engine speed signal S10. Then, the control unit 46 outputs a conversion start signal S12 to the A/D converter 60 to enable the converter 60 to initiate the conversion. Finally, the control unit 46 reads the output of the A/D converter 60 representing the engine speed value N after the A/D converter 60 outputs an end-of-conversion (EOC) signal S13. After the engine speed value N has been read, the program proceeds to a step 102.

In the step 102, the control unit 46 derives the current value L of engine load from the engine load signal S2. Specifically, the control unit 46 supplies the multiplexer 58 with a selection signal S11 designed to select the engine load signal S2. Then, the control unit 46 outputs the conversion start signal S12 to the A/D converter 60 to enable the converter 60 to initiate the conversion. Finally, the control unit 46 reads the output of the A/D converter 60 representing the engine load value L after the A/D converter 60 outputs the EOC signal S13. After the engine load value L has been read, the program proceeds to a step 104.

In the step 104, the control unit 46 determines a reference level f on the basis of the engine speed value N and the engine load value L. Specifically, the read-only memory in the memory unit 52 holds a table in which a set of reference levels f are plotted as a function of the engine speed and the engine load. By referring to this table, the control unit 46 determines the reference level f. These levels f are chosen to represent limits of the pressure across the filter 14 below which the degree of clogging of the filter 14 is acceptable.

In a step 106 subsequent to the step 104, the control unit 46 derives the current value ΔP of pressure across the filter 14 from the pressure difference signal S3. Specifically, the control unit 46 supplies the multiplexer 58 with a selection signal S11 designed to select the pressure difference signal S3. Then, the control unit 46 outputs the conversion start signal S12 to the A/D converter 60 to enable the converter 60 to initiate the conversion. Finally, the control unit 46 reads the output of the A/D converter 60 representing the pressure difference value ΔP after the A/D converter 60 outputs the EOC signal S13. It should be noted that the pressure across the filter 14 equals the difference in pressure between points upstream and downstream of the filter 14. After the difference pressure value ΔP has been read, the program proceeds to a step 108.

In the step 108, the control unit 46 determines whether or not the pressure difference value ΔP is greater than or equal to the reference level f. If the pressure difference value ΔP is lower than the reference level f, that is, when the degree of clogging of the filter 14 is acceptable, the program control of the control unit 46 returns to the step 100. Therefore, as long as the degree of clogging of the filter 14 remains acceptable, the series of the steps 100, 102, 104, 106 and 108 are repeated periodically so that the pressure across the filter 14 continues to be monitored and compared to the reference level f. If the pressure difference value ΔP is greater than or equal to the reference level f, that is, when the degree of clogging of the filter 14 is unacceptable, the program control proceeds to a step 110.

In the step 110, the control unit 46 determines whether or not the engine speed value N and the engine load value L reside within a preset range. This range is so chosen that engine conditions under which the values N and L are within this range are suitable for activation of the burner 16 and other engine conditions are unsuitable for activation of the burner 16. If the engine speed value N and the engine load value L are outside the preset range, that is, when engine conditions are unsuitable for activation of the burner 16, the program control of the control unit 46 returns to the step 100. Therefore, while engine conditions remain unsuitable for activation of the burner 16, the pressure across the filter 14 continues to be monitored and compared to the reference level f even in the case where the degree of clogging of the filter 14 is unacceptable. If the engine speed value N and the engine load value L reside within the preset range, that is, when engine conditions are suitable for activation of the burner 16, the program proceeds to a step 112.

In the step 112, the control unit 46 starts to energize the glow plug 22 via the final control signal S6. Specifically, the control unit 46 supplies the first switch circuit 62 with a primary control signal S14 designed to allow the switch circuit 62 to output the high-level final signal S6 to the glow plug 22 in order to commence energization of the glow plug 22.

In a step 114 subsequent to the step 112, the control unit 46 serves to initiate fuel supply to the burner 16. Specifically, the control unit 46 energize the fuel pump 26 via the final control signal S7 and opens the fuel control valve 28 via the final control signal S8. More specifically, the control unit 46 supplies the second switch circuit 64 with a primary control signal S15 designed to allow the switch circuit 64 to output the highlevel final signal S7 to the fuel pump 26 in order to commence energization of the fuel pump 26. At the same time, the control unit 46 supplies the gate 68 with the primary control signal S15 also designed to open the gate 68 in order to pass the rectangular pulse signal S16 from the oscillator 66 to the amplifier 70. As a result, the final signal S8 outputted by the amplifier 70 to the fuel control valve 28 intermittently opens the fuel control valve 28 so that fuel starts to be fed to the burner 16. The fuel thus supplied is ignited by the glow plug 22 which has been energized by the preceding step 112. In this way, the step 114 serves to initiate activation of the burner 16 in cooperation with the step 112.

In a step 116 subsequent to the step 114, the control unit 46 sets the timer 72. Specifically, the control unit 46 outputs the set signal S18 to the timer 72 to set the timer 72. In this way, when activation of the burner 16 is initiated, the timer 72 is set. After the step 116, the program control passes to a step 118.

In the step 118, operation of the control unit 46 delays or waits for a preset time interval. After expiration of this preset interval, the program control proceeds from the step 118 to a next step 120.

FIG. 4 shows the details of the step 118. In a first block 200 immediately subsequent to the step 116, the control unit 46 sets a variable J to the integer value "1". After the block 200, the control unit 46 performs the operation "J=J+1" in a block 202. In a final block 204 subsequent to the block 202, the control unit 46 determines whether or not the variable J equals a preset integer JO. If the variable J does not equal the integer JO, the program returns to the block 202. If the variable J equals the integer JO, the program proceeds from the block 204 to the next step 120. As a result, the control unit 46 repeats the blocks 202 and 204 until the variable J increases to the preset integer JO. In this way, the control of the control unit 46 delays a preset time interval defined by the integer JO in the step 118.

In the step 120, the control unit 46 derives the current value T0 of temperature in the exhaust passage 12 upstream of the burner 16 derived from the upstream temperature signal S4. Specifically, the control unit 46 supplies the multiplexer 58 with a selection signal S11 designed to select the upstream temperature signal S4. Then, the control unit 46 outputs the conversion start signal S12 to the A/D converter 60 to enable the converter 60 to initiate the conversion. Finally, the control unit 46 reads the output of the A/D converter 60 representing the upstream temperature value T0 after the A/D converter 60 outputs the EOC signal S13. After the upstream temperature value T0 has been read, the program proceeds to a step 122.

In the step 122, the control unit 46 derives the current value T1 of temperature in the exhaust passage 12 downstream of the burner 16 from the downstream temperature signal S5. Specifically, the control unit 46 supplies the multiplexer 58 with a selection signal S11 designed to select the downstream temperature signal S5. Then, the control unit 46 outputs the conversion start signal S12 to the A/D converter 60 to enable the converter 60 to initiate the conversion. Finally, the control unit 46 reads the output of the A/D converter 60 representing the downstream temperature value T1 after the A/D converter 60 outputs the EOC signal S13. After the downstream temperature value T1 has been read, the control passes to a step 124.

In the step 124, the control unit 46 determines whether or not the downstream temperature value T1 minus the upstream temperature value T0 is greater than or equal to a preset temperature level, for example, 100° C. Since a success of the ignition of fuel in the burner 16 by the glow plug 22 results in increases in the difference in temperature in exhaust passage 12 between points upstream and downstream of the burner 16, the difference between the temperature values T0 and T1 represents conditions of the ignition of fuel in the burner 16. The preset temperature level is chosen so that the temperature difference T1−T0 will always be below this preset level if the fuel has not been successfully ignited and will increase to and exceed this preset level when the fuel has been successfully ignited. If the temperature difference T1−T0 is lower than the preset temperature level, that is, when the fuel has not been successfully ignited, the program control proceeds to a step 126. If the temperature difference T1−T0 is greater than or equal to the preset temperature level, that is, when the fuel has been successfully ignited, the program control proceeds to a step 128. Since the temperature in the exhaust passage 12 downstream of the burner 16 will increase a certain time interval after the initiation of a successful fuel ignition, the previous delay step 118 serves to delay the moment of sampling of the temperature values T0 and T1 relative to the initiation of fuel ignition in view of this certain time interval.

In the step 126, the control unit 46 de-energizes the glow plug 22 via the final control signal S6. Specifically, the control unit 46 supplies the first switch circuit 62 with a primary control signal S14 designed to allow the switch circuit 62 to output the low-level final signal S6 to the glow plug 22 in order to de-energize the glow plug 22.

In a step 130 subsequent to the step 126, the control unit 46 resets the timer 72. Specifically, the control unit 46 outputs the reset signal S19 to the timer 72 to reset the timer 72. After the step 130, the program control proceeds to a step 132.

In the step 132, the control unit 46 serves to interrupt the fuel supply to the burner 16. Specifically, the control unit 46 de-energizes the fuel pump 26 and closes the fuel control valve 28 via the final control signals S7 and S8. More specifically, the control unit 46 supplies the second switch circuit 64 with a primary control signal S15 designed to allow the switch circuit 64 to output the low-level final signal S7 to the fuel pump 26 in order to de-energize the fuel pump 26. At the same time, the control unit 46 supplies the gate 68 with the primary control signal S15 also designed to close the gate 68 in order to interrupt the transmission of the rectangular pulse signal S16 from the oscillator 66 to the amplifier 70. As a result, the final signal S8 outputted by the amplifier 70 to the fuel control valve 28 holds the fuel control valve 28 closed. After the step 132, the program control returns to the first step 100.

If the fuel has not been properly ignited, the glow plug 22 is de-energized at the step 126 and the fuel supply to the burner 16 is interrupted at the step 132. In this case, the actions necessary to supply fuel to the burner 16 and ignite the supplied fuel are repeated, since the program control returns to the first step 100 from the step 132.

As is described previously, when the fuel has been properly ignited, the program control proceeds to the step 128. In the step 128, the control unit 46 deenergizes the glow plug 22 via the final control signal S6. Specifically, the control unit 46 supplies the first switch circuit 62 with the primary control signal S14 designed to allow the switch circuit 62 to output the low-level final signal S6 to the glow plug 22 in order to de-energize the glow plug 22.

In a step 134 subsequent to the step 128, operation of the control unit 46 delays or waits for a preset time interval. After expiration of this preset interval, the program proceeds from the step 134 to a next step 136. The details of this step 134 are similar to those of the previous delay step 118 shown in FIG. 4.

In the step 136, the control unit 46 derives the current value T1 of temperature in the exhaust passage 12 downstream of the burner 16 from the downstream temperature signal S5. The details of this step 136 are similar to those of the previous step 122. After the step 136, the program control proceeds to a step 138.

In the step 138, the control unit 46 determines whether or not the downstream temperature value T1 derived by the preceding step 136 is greater than or equal to a preset temperature level, for example, 500° C. Since acceptable combustion of fuel in the burner 16 results in increases in temperature of the exhaust passage 12 downstream of the burner 16, the downstream temperature value T1 is indicative of fuel combustion conditions. The preset temperature level is so chosen that the downstream temperature value T1 will be greater than or equal to this preset level when the fuel combustion is satisfactory and will be less than this preset level when the fuel has been extinguished. If the downstream temperature value T1 is less than the preset temperature level, that is, if the fuel has been extinguished, the program control proceeds to the timer reset step 130 and then to the fuel-supply interruption step 132 before returning to the first step 100. In this case, the fuel supply to the burner 16 is interrupted and then the actions necessary to supply fuel to the burner 16 and ignite the supplied fuel are repeated. This interruption of fuel supply to the burner 16 prevents waste of fuel and thus prevents a great amount of unburned fuel from entering and then burning in the filter 14, thereby generating excessive heat and damaging the filter 14. If the downstream temperature value T1 is greater than or equal to the preset temperature level, that is, when the fuel combustion is satisfactory, the control unit 46 proceeds to a step 140.

In the step 140, the control unit 46 determines whether the timer 72 is in the ON state or in the OFF state. Specifically, the control unit 46 determines whether the output signal S20 from the timer 72 is high or low. If the timer 72 is in the ON state, the program control returns to the step 136. If the timer 72 is in the OFF state, the program control proceeds to the fuel-supply interruption step 132. As a result, the satisfactory fuel combustion is maintained and also the downstream temperature value continues to be monitored and compared to the preset level until the timer 72 spontaneously returns from the ON state to the OFF state. In this way, satisfactory fuel combustion continues for the preset time interval defined by the output duration of the timer 72. In the case where the fuel has been extinguished prior to the end of this preset time interval, the program control returns from the step 138 to the first step 100 by way of the timer reset step 130 and the fuel-supply interruption step 132 so that wasteful supply of fuel to the burner 16 is prevented and also the actions necessary to supply fuel to the burner 16 and ignite the supplied fuel are repeated.

Since the temperature in the exhaust passage 12 downstream of the burner 16 will increase a certain time interval after the satisfactory fuel combustion, the previous delay step 134 serves to delay the moment of initial sampling of the downstream temperature value T1 relative to fuel ignition in view of this certain time interval.

What is claimed is:

1. An exhaust particle removal system for an internal combustion engine from which an exhaust passage extends to conduct exhaust from the engine, the system comprising:
   (a) a filter disposed in the exhaust passage for filtering particles out of the exhaust;
   (b) a burned disposed in the exhaust passage upstream of the filter for burning off the particles deposited on the filter;
   (c) first means for determining whether or not the filter has become unacceptably clogged;
   (d) second means for supplying fuel to the burner for a preset time when the filter is unacceptably clogged;
   (e) third means for igniting the supplied fuel in the burner;
   (f) fourth means for determining whether or not the fuel supplied to the burner ceases to burn prior to the end of the preset time; and
   (g) fifth means for suspending the fuel supply to the burner in the case where the fuel supplied to the burner ceases to burn prior to the end of the preset time.

2. An exhaust particle removal system as recited in claim 1, further comprising sixth means for activating the second and third means again after the fuel supply to the burner is suspended by the fifth means.

3. An exhaust particle removal system as recited in claim 1, wherein the fourth means includes a temperature sensor for sensing temperature in the exhaust passage downstream of the burner but upstream of the filter and means for determining whether or not the fuel ceases to burn on the basis of the sensed temperature.

4. A method of clearing an automotive exhaust filter of clogging, combustion particulates, comprising the steps of:
   (a) supplying fuel to a burner disposed in an exhaust passage upstream of the filter;
   (b) igniting the supplied fuel;
   (c) detecting whether the fuel supplied to the burner is burning;
   (d) if the fuel is not burning after ignition, cutting off the supply of fuel to the burner and repeating the steps (a), (b), and (c); and
   (e) if the fuel continues to burn for a predetermined period of time after ignition, cutting off the fuel supply to the burner.

* * * * *